May 16, 1950     S. M. RICHMOND     2,507,935
PERISCOPE
Filed June 21, 1948     2 Sheets-Sheet 1
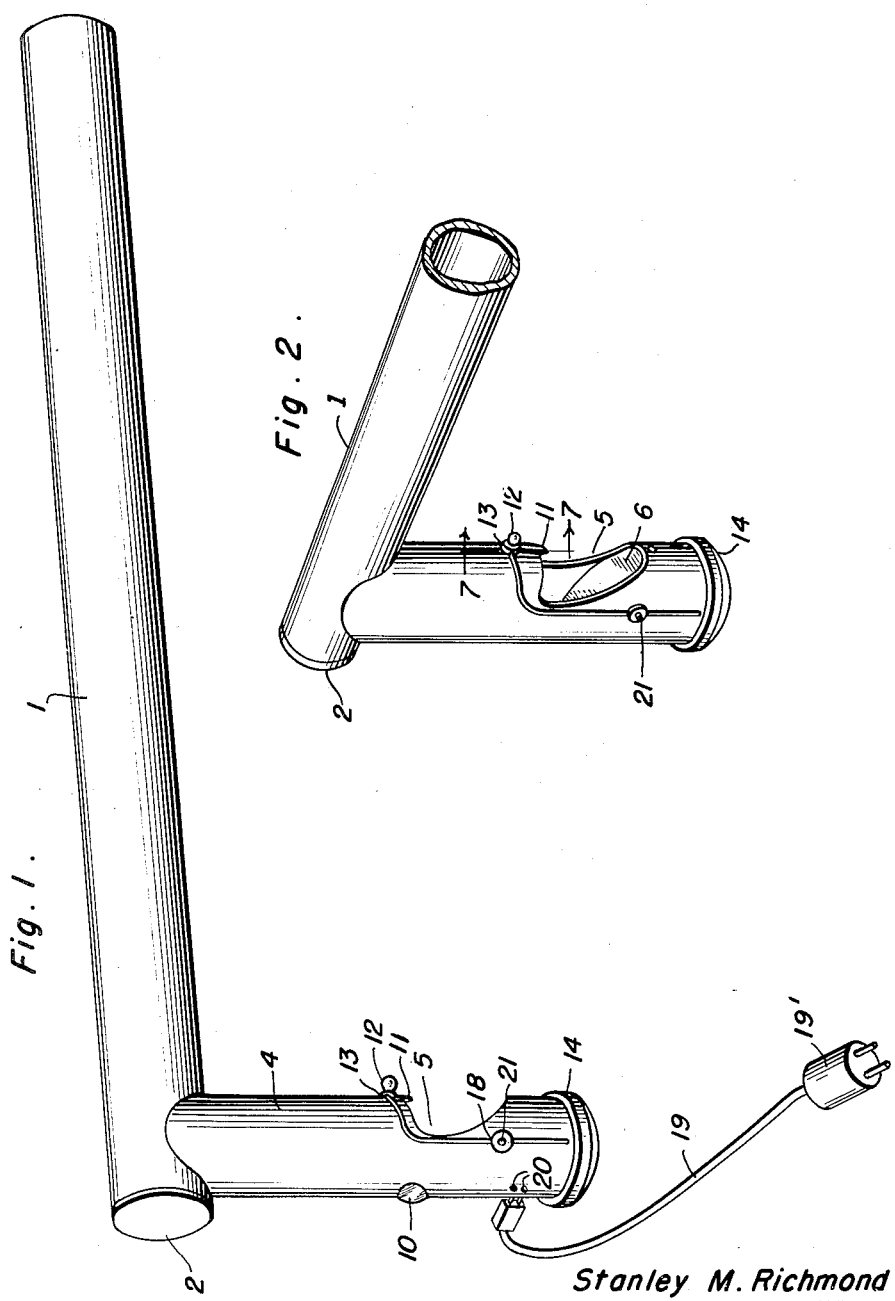
Stanley M. Richmond
INVENTOR.
BY Clarence A. O'Brien
and Harvey B. Jacobson
Attorneys

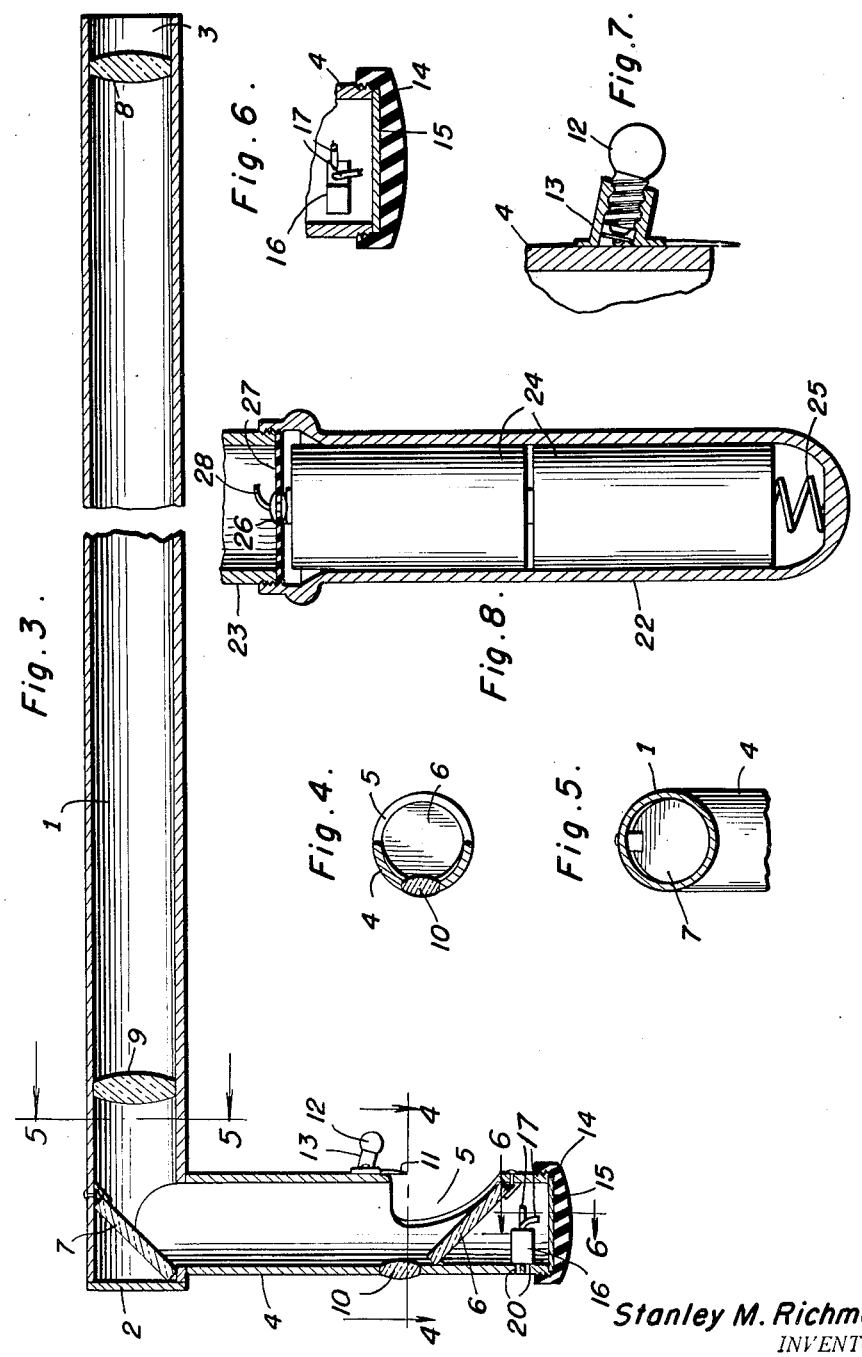

Patented May 16, 1950

2,507,935

UNITED STATES PATENT OFFICE 2,507,935

PERISCOPE

Stanley M. Richmond, Eugene, Oreg.

Application June 21, 1948, Serial No. 34,162

3 Claims. (Cl. 128—2)

My invention relates to improvements in periscopes for use especially by physicians to enable patients to see in the uterine cervix region areas of infection, especially precancerous lesions.

By way of explanation, during examination and treatment of this region by physicians, it is difficult and next to impossible to properly explain and enlighten the patient regarding her condition, the necessity for treatment, and the results of treatment. Many intelligent patients are anxious to see for themselves the pathological condition in this region which the physician attempts to explain, and also the results of treatment as it progresses.

Having the foregoing in mind, it is the primary object of my invention to provide a periscope of simple form and construction enabling a patient to observe the infected uterine cervix region while the periscope is focused on the infected region by the physician and the physician explains the condition and the factors incident thereto, such as the reasons for treatment recommended, the progress under treatment and the like.

Other and subordinate objects, together with the precise nature of my improvements and the advantages thereof, will be readily understood when the succeeding description and claims are read with reference to the drawings accompanying and forming part of this specification.

In said drawings:

Figure 1 is a view in perspective of my improved periscope in the preferred embodiment thereof;

Figure 2 is a similar fragmentary view looking at the opening side of the objective tube;

Figure 3 is a view in longitudinal section drawn to a larger scale;

Figure 4 is a view in horizontal section taken on the line 4—4 of Figure 3;

Figure 5 is a fragmentary view in transverse section taken on the line 5—5 of Figure 3;

Figure 6 is a fragmentary view in vertical section taken on the line 6—6 of Figure 3 and drawn to a larger scale;

Figure 7 is a fragmentary view in vertical section taken on the line 7—7 of Figure 2 and drawn to a larger scale; and Figure 8 is a fragmentary view in vertical section of a modified embodiment of the invention.

Referring now to the drawings by numerals, and first to Figures 1 to 7 thereof, in the preferred embodiment, my improved periscope comprises an ocular tube 1 of substantial length, with a closed rear end 2 and an open front eye-sighting end 3. At the rear end of the ocular tube is an objective tube 4, substantially shorter, relatively, and extending at a right angle therefrom with an inner end suitably fixed to said tube 1 and opening into the same.

A side opening 5 is provided in the objective tube 4 on the same side thereof as the ocular tube 1 and adjacent to the outer end of said tube 4.

An oblique mirror 6 is suitably fixed in the objective tube 4 opposite the opening 5 to be exposed thereby and is arranged to reflect an image through said tube to a reversely oblique mirror 7 suitably fixed in the rear end 2 of the ocular tube 1 and facing the front eye-sighting end 3 of said tube 1.

A pair of suitable lenses 8, 9 are provided in the ocular tube 1 in front of the mirror 7 and are constructed and arranged so that the image viewed therethrough in the mirror 7 by the eye of a patient sighting in said front end 3 of the ocular tube 1 will be clear and magnified.

A magnifying focusing lens 10 is fixed, in any suitable manner, in the side of the objective tube 4 opposite the opening 5 for sighting through said opening over the mirror 6. The magnifying focusing lens 10 is designed to be centered on a finger 11 extending into the opening 5 from one edge thereof in suitably fixed position on the objective tube 4, opposite said lens 10, the arrangement being such that said finger may be centered in the axis of the lens 10 and both centered relative to the objective field or region, the image of which is to be reflected in the mirror 6, and consequently in the mirror 7.

As will be understood, in using said lens 10 and the finger 11 as described, the image will be centered in both mirrors 6, 7. The magnifying focusing lens 10 may be suitably marked, in a manner not shown, to facilitate centering the finger 11 in the axis of the lens.

An electric light 12 is secured in a socket 13 at an edge portion of the opening 5 opposite the mirror 6 to illuminate said mirror and the objective field or region.

A cap 14 of insulation material with a stiffener liner 15 is threaded onto the outer end of the objective tube 4 to close said end.

A suitable plug socket 16 is fixed inside said tube 4, between the mirror 6 and liner 15, with wires 17 leading therefrom out of said tube 4 and through an insulation cable 18 to the socket 13, for the electric light 12, in the usual manner.

A plug-in line 19 is provided for plugging into a house circuit and through openings 20 in said tube 4 into the socket 16. A conventional fixed voltage transformer 19′ may be provided at the distal end of said line 19 for plugging into the house circuit.

A push-button switch 21 on the objective tube 4 is suitably interposed in one line 17 for opening and closing circuit to the electric light 12.

In the modified embodiment of the invention shown in Figure 8, a hollow handle 22 is provided for threaded attachment to the outer end of the objective tube, designated 23, and to contain the usual pair of flashlight batteries 24 backed by the usual spring 25 with the pole of one battery urged against a contact 26 in an insulation disk 27 at the outer end of said tube 23 held against said end by the pressure exerted against the batteries. A lead 28 extends from the contact 26 for connection in any suitable manner to the electric light 12 to energize said light, as in the usual flashlight, and under control of a conventional switch, not shown, which may be provided in said handle 22 or in the tube 23.

In using the described periscope, the mirror 6 is focused on the objective field, not shown, of the uterine cervix region through the vaginal orifice dilated by the usual speculum in a manner well understood in the art. The focusing is done by the physician, holding the objective tube 4, or the handle 22, as the case may be, with the mirror 6 facing the objective field and the magnifying focusing lens 10 and finger 11 used in the manner described. With the mirror 6 properly focused, the ocular tube 1 is extended over the abdomen and chest of the patient to within a convenient distance from the eye of the patient so that she may view through the front eye-sighting end 3 the image reflected in the mirror 7. In connection with focusing the mirror 6, it is to be noted that the electric light 12 inclines from the objective tube 4 in a manner to direct light rays both into the vaginal orifice and into the opening 5 through the mirror 6. Thus, the objective field, or region, is illuminated together with the mirror 6. As will be manifest, the physician, while holding the periscope with the mirror 6 focused, may explain and instruct the patient regarding her condition with the aid of the image seen by the patient.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. A periscope for focusing by a physician to enable a patient to see through the dilated vaginal orifice infected areas of the uterine cervix region comprising an objective tube having a side opening therein adjacent one end and an oblique mirror therein opposite to and exposed by said opening for focusing on the infected area by a physician holding the tube to reflect an image of the infected area toward the other end of the tube, an ocular tube attached to said other end of the objective tube and adapted to extend therefrom for a substantial distance for sighting in one end thereof by the patient, means in said ocular tube for rendering visible to the eye of the sighting patient the image reflected by said mirror, and a lens in said objective tube opposite said opening through which the physician may sight over said mirror and through said opening in focusing said mirror.

2. A periscope for focusing by a physician to enable a patient to see through the dilated vaginal orifice infected areas of the uterine cervix region comprising an objective tube having a side opening therein adjacent one end and an oblique mirror therein opposite to and exposed by said opening for focusing on the infected area by a physician holding the tube to reflect an image of the infected area toward the other end of the tube, an ocular tube attached to said other end of the objective tube and adapted to extend therefrom for a substantial distance for sighting in one end thereof by the patient, means in said ocular tube for rendering visible to the eye of the sighting patient the image reflected by said mirror, and a lens in said objective tube opposite said opening through which the physician may sight over said mirror and through said opening in focusing said mirror, said objective tube having an electric light therein on the same side as said opening for illuminating the infected area and said mirror said light illuminating the mirror through said opening.

3. A periscope for focusing by a physician to enable a patient to see through the dilated vaginal orifice infected areas of the uterine cervix region comprising an objective tube having a side opening therein adjacent one end and an oblique mirror therein opposite to and exposed by said opening for focusing on the infected area by a physician holding the tube to reflect an image of the infected area toward the other end of the tube, an ocular tube attached to said other end of the objective tube and adapted to extend therefrom for a substantial distance for sighting in one end thereof by the patient, means in said ocular tube for rendering visible to the eye of the sighting patient the image reflected by said mirror, and a lens in said objective tube opposite said opening through which the physician may sight in focusing said mirror, said objective tube having a finger therein projecting over the opening for centering in the axis of said lens and on said region to facilitate accurately focusing the mirror.

STANLEY M. RICHMOND.

REFERENCES CITED

The following references are of record in the file of this patent:

UNITED STATES PATENTS

| Number | Name | Date |
| --- | --- | --- |
| 731,496 | Poirier et al. | June 23, 1903 |
| 1,602,233 | Lyon | Oct. 5, 1926 |
| 2,002,595 | Wappler | May 28, 1935 |